United States Patent
Liao et al.

(10) Patent No.: US 9,125,270 B2
(45) Date of Patent: Sep. 1, 2015

(54) LED DIMMING DEVICE AND LED DIMMING AND DRIVING CIRCUIT

(75) Inventors: Weiming Liao, Shenzhen (CN); Matthew Man Ho Ku, Irvine, CA (US); Yue Zheng, Shenzhen (CN); Lifang Guo, Shenzhen (CN); Guangyao You, Shenzhen (CN)

(73) Assignee: FREMONT MICRO DEVICES (SZ) LIMITED, Shenzhen (CN)

( * ) Notice: Subject to any disclaimer, the term of this patent is extended or adjusted under 35 U.S.C. 154(b) by 597 days.

(21) Appl. No.: 13/528,804

(22) Filed: Jun. 20, 2012

(65) Prior Publication Data

US 2013/0241424 A1    Sep. 19, 2013

(30) Foreign Application Priority Data

Mar. 13, 2012 (CN) .......................... 2012 1 0064668

(51) Int. Cl.
| | |
|---|---|
| H05B 33/08 | (2006.01) |
| H05B 37/02 | (2006.01) |
| H05B 39/04 | (2006.01) |
| H05B 41/36 | (2006.01) |
| G05F 1/00 | (2006.01) |

(52) U.S. Cl.
CPC .................................. *H05B 33/0845* (2013.01)

(58) Field of Classification Search
CPC ........... H05B 33/0815; H05B 33/0818; H05B 33/083; H05B 33/0827; H05B 33/0869; H05B 37/02; H05B 33/0812; H05B 33/0824; H05B 33/0848; H05B 33/0851; H05B 33/0863; H05B 33/0866; H05B 33/0887; H05B 33/089; H05B 33/0896; H02M 3/335
See application file for complete search history.

(56) References Cited

U.S. PATENT DOCUMENTS

2010/0026208 A1* 2/2010 Shteynberg et al. .......... 315/297
2011/0285301 A1* 11/2011 Kuang et al. .............. 315/200 R

* cited by examiner

*Primary Examiner* — Douglas W Owens
*Assistant Examiner* — Dedei K Hammond
(74) *Attorney, Agent, or Firm* — Locke Lord LLP; Tim Tingking Xia, Esq.

(57) ABSTRACT

A LED dimming device, and a LED dimming and a driving circuit using such LED dimming device are discussed. In present embodiment, the LED dimming device multiplexes an inputting switch and/or a sampling module of the LED driving circuit for dimming. such LED dimming device will not affect the sine waves of input current, in such a way, power factor and work efficiency will be increased while the harmonic coefficient and interference signal will be reduced.

12 Claims, 10 Drawing Sheets

LED DIMMING DEVICE AND LED DIMMING AND DRIVING CIRCUIT

CROSS-REFERENCE TO RELATED APPLICATIONS

This non-provisional application claims priority under 35 U.S.C. §119(a) on Patent Application No. 201210064668.3 filed in P.R. China on Mar. 13, 2012, the entire contents of which are hereby incorporated by reference.

FIELD OF THE INVENTION

The present invention relates to Low Emitting Diode (LED) lighting field, and more particularly relates to a LED dimming device, and a LED dimming and a driving circuit using such LED dimming device.

BACKGROUND OF THE INVENTION

Silicon controlled rectifier dimmers are generally used by common incandescent lamps and halogen lamps for dimming. Silicon controlled rectifier dimmers alter the effective current value of the AC current through changing the conduction angle, so as to dim the incandescent lamps and halogen lamps.

Figure 1:
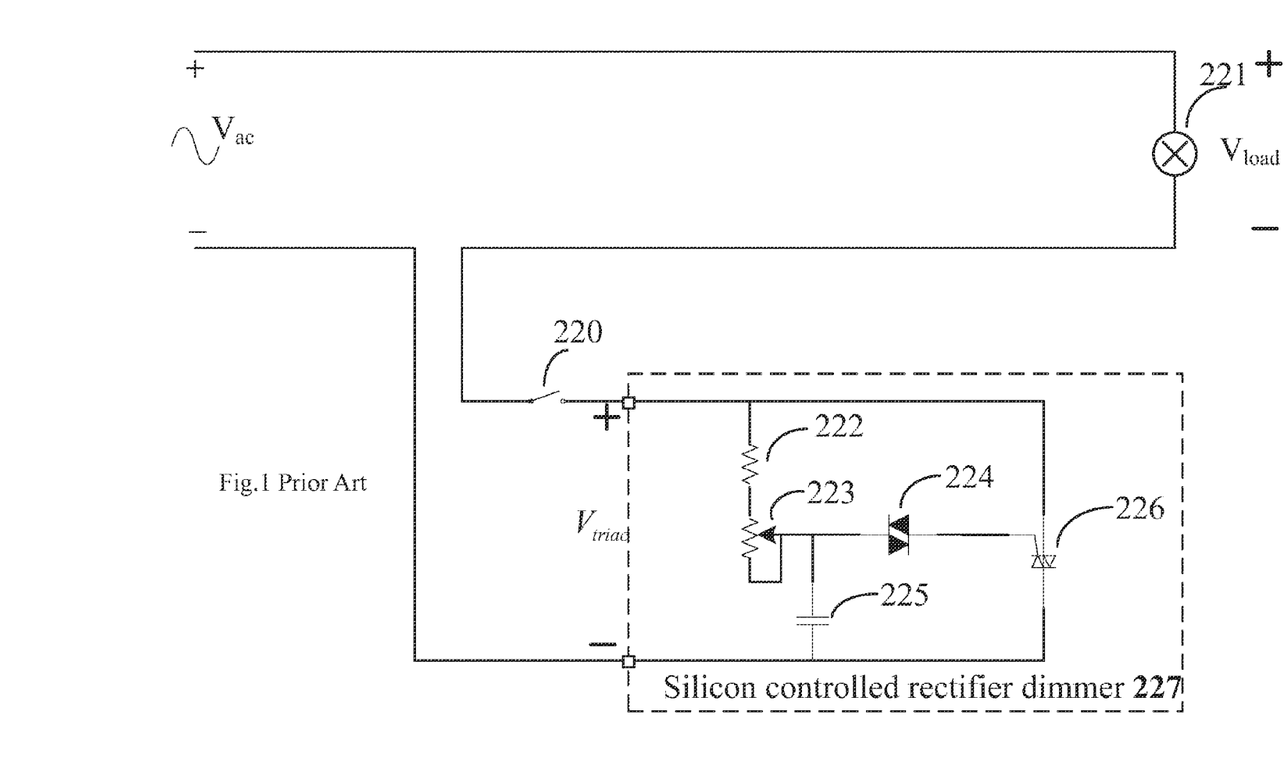
FIG. 1 shows a block diagram of an exemplary prior-art silicon controlled rectifier dimmer.
Figure 2:
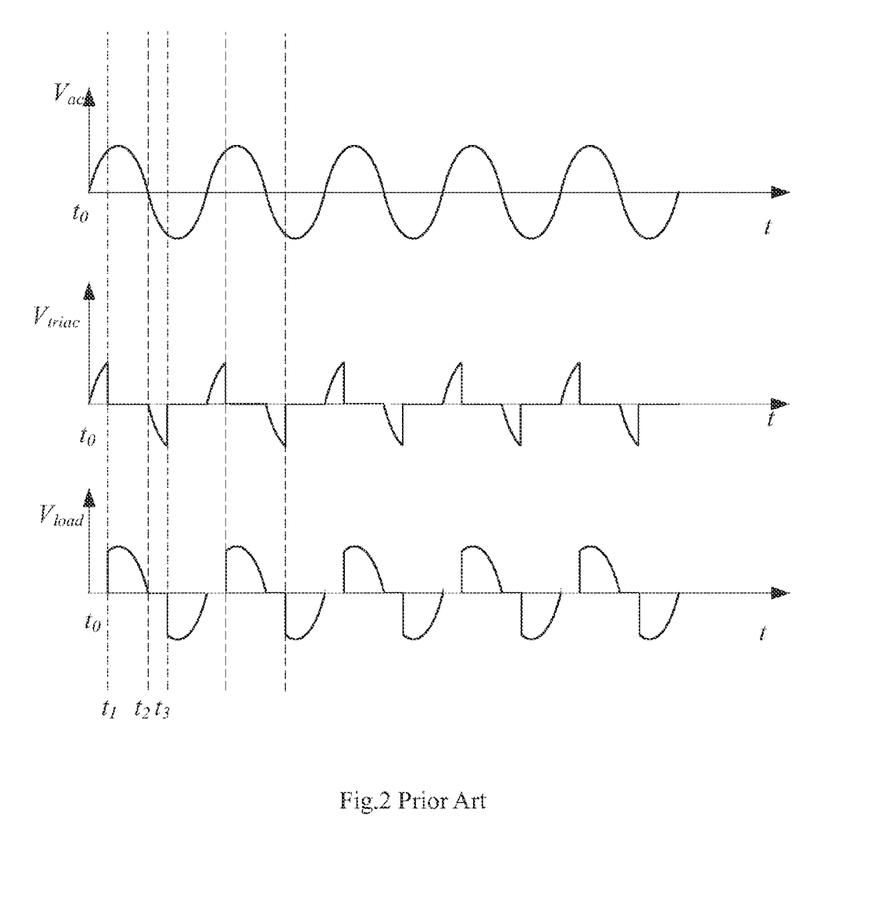
FIG. 2 shows the perfect operation wave of the silicon controlled rectifier dimmer in FIG. 1.

FIG. 1 shows a block diagram of an exemplary prior-art silicon controlled rectifier dimmer 227. In such a silicon controlled rectifier dimmer 227, a RC network comprising a resistor 222, an adjustable resistor 223 and a capacitor 225 can delay the conducting duration of the silicon controlled rectifier 226 until the capacitor 225 is charged and voltage $V_{triac}$ 226 reaches a triggering voltage value. Then the silicon controlled rectifier 226 is turned on, so the silicon controlled rectifier dimmer 227 works, and the perfect operation wave of which is shown in FIG. 2. Wherein, during a time duration from moment $t_0$ to moment $t_1$, the silicon controlled rectifier 226 is turned off, which results in an open circuit. So voltage between the two terminals of load 221 is 0. When voltage of capacitor 225 is charged to a certain value (at moment $t_1$), the silicon controlled rectifier 226 is turned on, which results in a short circuit. So voltage between the two terminals of load 221 is equal to $V_{ac}$. In a half cycle period from moment $t_0$ to moment $t_2$, during a time duration from moment $t_1$ to moment $t_2$, the silicon controlled rectifier 226 is turned on and the resistance of adjustable resistor 223 is adjusted to change the duration of the on time for dimming.

According to the prior-art dimming method, only one silicon controlled rectifier dimmer 227 is required, and no other circuits and elements should be added. The advantage of using silicon controlled rectifier dimmer 227 is its simplicity of circuit implementation. In additional, changing the conduction angle directly will not affect power factor of resistive light emitters such as incandescent lamps and halogen lamps. Accordingly, dimming by a silicon controlled rectifier dimmer can be widely used in the illumination of incandescent lamps.

Figure 3:
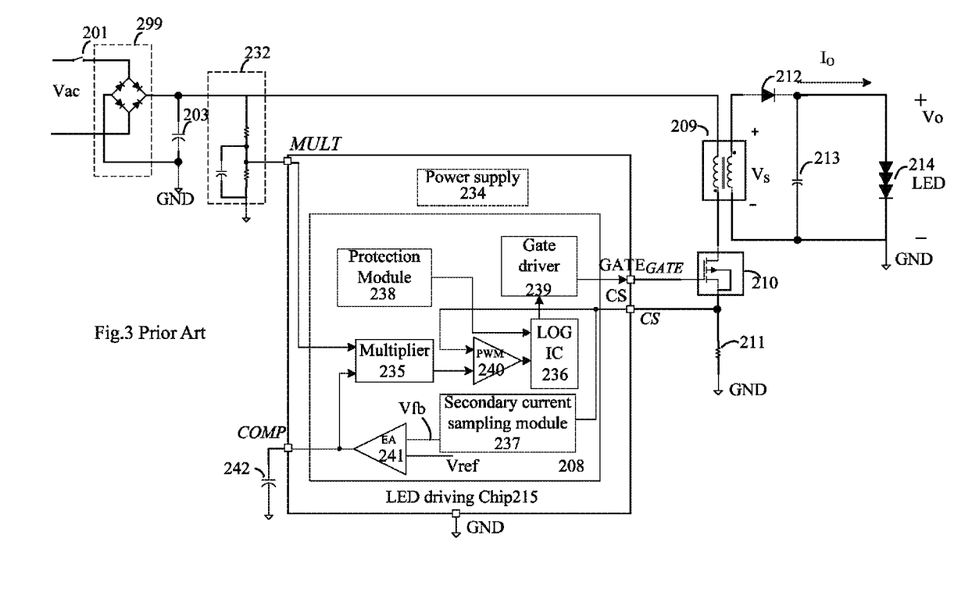
FIG. 3 shows a functional block diagram of an exemplary prior-art LED driving circuit.

FIG. 3 shows a functional block diagram of an exemplary prior-art LED driving circuit. As shown in FIG. 3, LED driving chip 215 senses the primary current information at CS terminal, and transforms the primary current information into a voltage $V_{fb}$ which is proportional to the secondary current via secondary current sampling module 237. Voltage $V_{fb}$ reaches reference voltage $V_{ref}$ via a negative feedback clamping, so as to drive LED with a constant current. Accordingly, to some extent, reference voltage $V_{ref}$ decides the lighteness of the LEDs.

Many LED illuminations employ silicon controlled rectifier dimmer for dimming so as to be compatible with existing illumination application circumstance. However, problems as follows present in LED illuminations when using silicon controlled rectifier dimmer for dimming.

1. Sine waves of input current are destroyed by dimming via a silicon controlled rectifier dimmer, and power factor is also reduced. Normally, power factor of the LED driving circuit employs silicon controlled rectifier dimmer for dimming is lower than 0.5. Moreover, the smaller the conducting angle, the worse the power factor.

2. The nonsine waves increase harmonic coefficient while reducing the power factor.

3. The nonsine waves generate serious interference signals in the circuit.

4. Dimming via a silicon controlled rectifier dimmer is unstable for a small load such as a LED, and requires a bleeder resistor consuming additional power and reducing efficiency.

To sum up, a LED dimming device being compatible with existing illumination application circumstance and possessing high efficiency is highly demanded.

SUMMARY OF THE INVENTION

The primary objective of the present invention is to provide a LED dimming device that not only compatible with existing illumination application circumstance but also have high efficiency, aiming at the technical problems mentioned above.

According to one aspect, the present invention relates to a LED dimming device connected with a LED driving circuit and comprising a dimming action module, a dimming action detector, a dimming action determining module and a dimming state control module. In present embodiment, the dimming action module generates a dimming action signal. The dimming action detector generates a dimming instruction voltage based on the dimming action signal. The dimming action determining module generates a dimming state changing signal or a resetting signal based on the dimming instruction voltage. The dimming state control module generates a LED current control signal for controlling a current of the LED based on the dimming state changing signal or clears stored dimming state information based on the resetting signal.

In one embodiment, the LED dimming device further comprises a digital-to-analog converter for converting a digital LED current control signal generated by the dimming state control module to an analog LED current control signal.

In one embodiment, the dimming action module multiplexes an inputting switch of the LED driving circuit. Furthermore, the inputting switch is connected between an AC input terminal and a rectification module of the LED driving circuit.

In another embodiment, the dimming action detector multiplexes a sampling module of the LED driving circuit. In present embodiment, the sampling module comprises a first sampling resistor, a second sampling resistor and a sampling capacitor. Wherein, the first sampling resistor and the second sampling resistor are connected in series between an outputting terminal of the rectification module and ground. The connection point of the first sampling resistor and second sampling resistor outputs the dimming instruction voltage. The sampling capacitor is connected between the connection point and ground.

In one embodiment, the dimming action detector comprises a comparator, an oscillator, an and gate, a counter and an inverter. In present embodiment, the comparator receives a reference voltage via a positive terminal, and couples the dimming action detector via a negative terminal. The oscillator generates a timing pulse. The and gate couples the oscillator via a first inputting terminal and couples an outputting terminal of the comparator via a second inputting terminal. The counter couples an outputting terminal of the and gate via a counting terminal, couples the outputting terminal of the comparator via a resetting terminal, and outputs the resetting signal via an outputting terminal. In present embodiment, the inverter couples the outputting terminal of the comparator via an inputting terminal, and outputs the dimming state changing signal via an outputting terminal.

According to another aspect, the present invention relates to a LED dimming driving circuit comprising a LED driving circuit and a LED dimming device connected with the LED driving circuit. In present embodiment, the LED dimming device comprises a dimming action module, a dimming action detector, a dimming action determining module and a dimming state control module. In present embodiment, the dimming action module generates a dimming action signal. The dimming action detector generates a dimming instruction voltage based on the dimming action signal. The dimming action determining module generates a dimming state changing signal or a resetting signal. The dimming state control module generates a LED current control signal for controlling a current of the LED based on the dimming state changing signal or clears stored dimming state information based on the resetting signal.

In one embodiment, the LED dimming device further comprises a digital-to-analog converter for converting a digital LED current control signal generated by the dimming state control module to an analog LED current control signal.

In one embodiment, the dimming action module multiplexes an inputting switch of the LED driving circuit. Furthermore, the inputting switch is connected between an AC input terminal and a rectification module of the LED driving circuit.

In another embodiment, the dimming action detector multiplexes a sampling module of the LED driving circuit. In present embodiment, the sampling module comprises a first sampling resistor, a second sampling resistor and a sampling capacitor. Wherein, the first sampling resistor and the second sampling resistor are connected in series between an outputting terminal of the rectification module and ground. The connection point of the first sampling resistor and second sampling resistor outputs the dimming instruction voltage. The sampling capacitor is connected between the connection point and ground.

In one embodiment, the dimming action detector comprises a comparator, an oscillator, an and gate, a counter and an inverter. In present embodiment, the comparator receives a reference voltage via a positive terminal, and couples the dimming action detector via a negative terminal. The oscillator generates a timing pulse. The and gate couples the oscillator via a first inputting terminal and couples an outputting terminal of the comparator via a second inputting terminal. The counter couples an outputting terminal of the and gate via a counting terminal, couples the outputting terminal of the comparator via a resetting terminal, and outputs the resetting signal via an outputting terminal. In present embodiment, the inverter couples the outputting terminal of the comparator via an inputting terminal, and outputs the dimming state changing signal via an outputting terminal.

When operating, the LED dimming device and the driving circuit using such LED dimming device will not affect the sine waves of the input current, in such a way, power factor and work efficiency will be increased while the harmonic coefficient and interference signal will be reduced.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention, and wherein.

DETAILED DESCRIPTION OF THE PREFERRED EMBODIMENT

These and other advantage, aspect and novel features of the present invention, as well as details of an illustrated embodiment thereof, will be more fully understand from the following description and drawings. While various embodiments of the present invention has been presented by way of example only, and not limitation.

Figure 4:
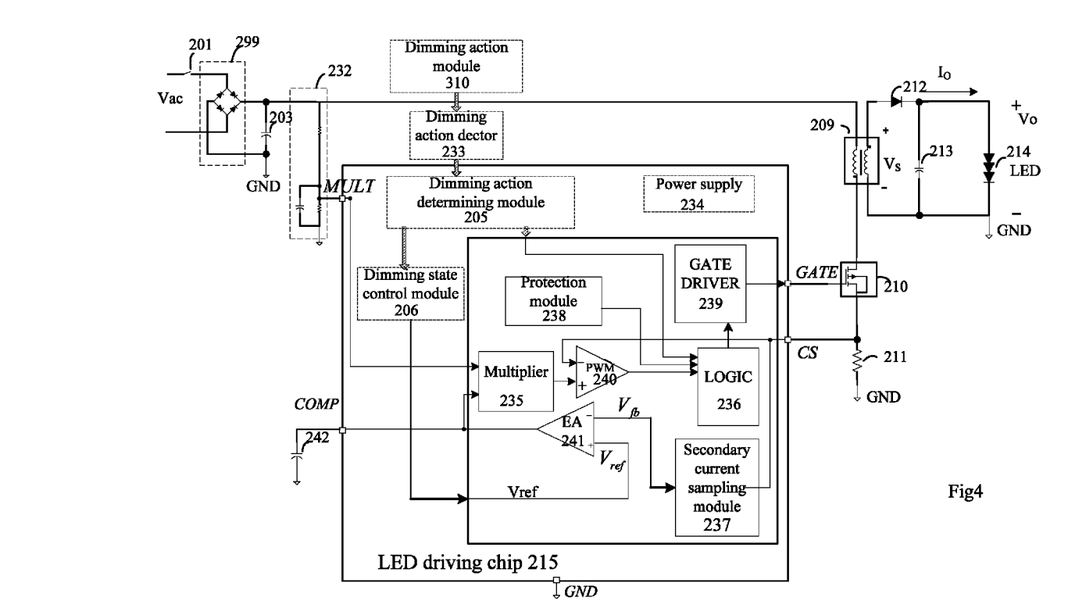
FIG. 4 shows a functional block diagram of a LED dimming device according to a first embodiment of present invention.

FIG. 4 shows a functional block diagram of a LED dimming device according to a first embodiment of present invention. As shown in FIG. 4, the LED dimming device comprises a dimming action module 310, a dimming action detector 233, a dimming action determining module 205 and a dimming state control module 206. The LED dimming device is coupled to a LED driving chip 215 of the LED driving circuit. In present invention, the dimming action module 310 generates a dimming action signal. One skilled in the art knows that the dimming action module 310 can be any known triggering module, such as a switch, a key, a button and so on. In one preferable embodiment of present invention, the switch 201 of the LED driving circuit is multiplexed as dimming action module 310. The dimming action detector 233 receives the dimming action signal from the dimming action module 310, and generates a dimming instruction voltage based on the dimming action signal. One skilled in the art knows that, the dimming action detector 233 can be any circuit, module or chip which can be used to receive the dimming action signal and generate corresponding voltage signal. In one preferable embodiment of present invention, a sampling module 232 of the LED driving circuit can be multiplexed as the dimming action determining module 233. The dimming action determining module 205 receives the dimming instruction voltage from the dimming action determining module 233 and generates a dimming state changing signal or a resetting signal based on such dimming instruction voltage. One skilled in the art knows that the dimming action determining module 205 can be any signal generating unit that can generate signals of different states based on specific voltages. Based on the teaching of present invention, one skilled in the art can construct such kind of dimming action determining module. Dimming state control module 206 receives the dimming state changing signal or the resetting signal from the dimming action determining module 205. When receiving the dimming state changing signal, the dimming state control module 206 generates a LED current control signal for controlling a current of the LED based on the dimming state changing signal. When receiving the resetting signal, the dimming state control module 206 clears stored dimming state information based on the resetting signal. In one embodiment of present invention, the dimming state control module 206 directly generates an analog LED current control signal for controlling the current of the LED. In another embodiment of present invention, the dimming state control module 206 only can generate a digital LED current control signal for controlling the current of the LED. Accordingly, in such embodiment, a digital-to-analog converter is added for converting the digital LED current control signal generated by the dimming state control module 206 to an analog LED current control signal. The analog LED current control signal controls current going through the LED via error amplifier 241, secondary current sampling module 237 and switch tube 210 in LED driving chip 215.

When operating, the LED dimming device of present invention will not affect the sine waves of input current, in such a way, power factor and work efficiency will be increased while the harmonic coefficient and interference signal will be reduced.

Figure 5:
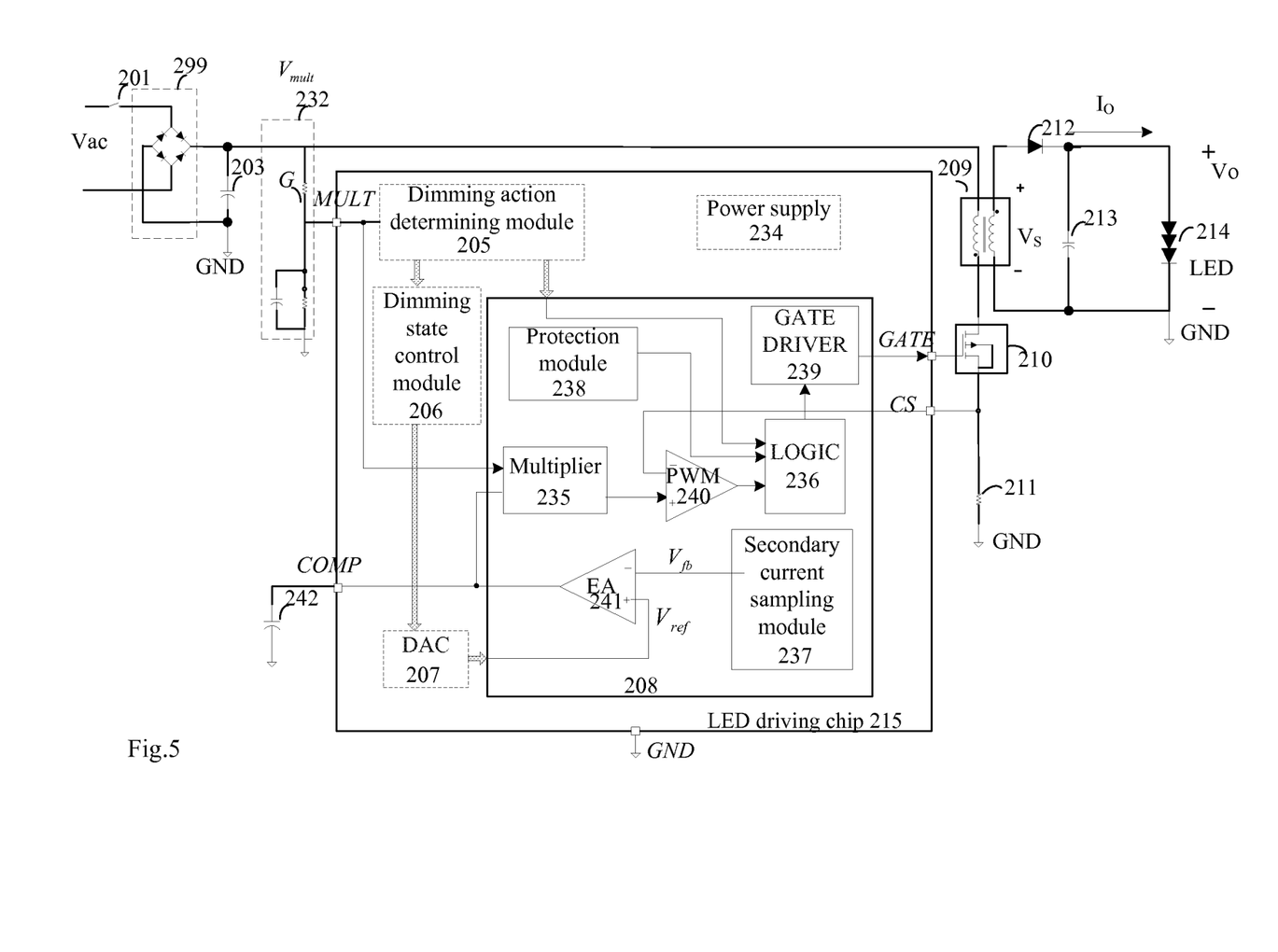
FIG. 5 shows a functional block diagram of a LED dimming device according to a second embodiment of present invention.

FIG. 5 shows a functional block diagram of a LED dimming device according to a second embodiment of present invention. As shown in FIG. 5, the LED dimming device is coupled into the LED driving chip 215 of the LED driving circuit. In present embodiment, the LED dimming device according to present invention comprises a dimming action module 310, a dimming action detector 233, a dimming action determining module 205 and a dimming state control module 206. In present embodiment, the switch 201 of the LED driving circuit is multiplexed as dimming action module 310, the sampling module 232 of the LED driving circuit can be multiplexed as the dimming action determining module 233. As shown in FIG. 5, the inputting switch 201 is connected between an AC input terminal and a rectification module 209 of the LED driving circuit. In present embodiment, the sampling module 232 comprises a first sampling resistor, a second sampling resistor and a sampling capacitor. Wherein, the first sampling resistor and the second sampling resistor are connected in series between an outputting terminal of the rectification module 209 and ground. The connection point G of the first sampling resistor and second sampling resistor outputs the sampling voltage $V_{mult}$. When switch 201 is turned on or off, sampling voltage $V_{mult}$ changes. The dimming action determining module 205 determines whether the action of the switch represents dimming or turnoff. If the dimming action determining module 205 determines that the action of the switch represents dimming, the dimming action determining module 205 generates a dimming state changing signal. If the dimming action determining module 205 determines that the action of the switch represents turnoff, the dimming action determining module 205 generates a resetting signal. Dimming state control module 206 receives the dimming state changing signal or the resetting signal from the dimming action determining module 205. When receiving the dimming state changing signal, the dimming state control module 206 generates a LED current control signal for controlling a current of the LED based on the dimming state changing signal. When receiving the resetting signal, the dimming state control module 206 clears stored dimming state information based on the resetting signal. In one embodiment of present invention, the dimming state control module 206 directly generates an analog LED current control signal for controlling the current of the LED. In another embodiment of present invention, the dimming state control module 206 only can generate a digital LED current control signal for controlling the current of the LED. Accordingly, in such embodiment, a digital-to-analog converter is added for converting the digital LED current control signal generated by the dimming state control module 206 to an analog LED current control signal. The analog LED current control signal controls current going through the LED via error amplifier 241, secondary current sampling module 237, switch tube 210 in LED driving chip 215.

When operating, the LED dimming device of present invention will not affect the sine waves of input current, in such a way, power factor and work efficiency will be increased while the harmonic coefficient and interference signal will be reduced. Furthermore, the switch and sampling module in the LED driving circuit are multiplexed in present embodiment, so complexity of the circuit implementation is reduced which is in turns to have minimum cost. In additional, by employing present invention, dimming of LED is achieved without adding any periphery circuit.

Figure 6:
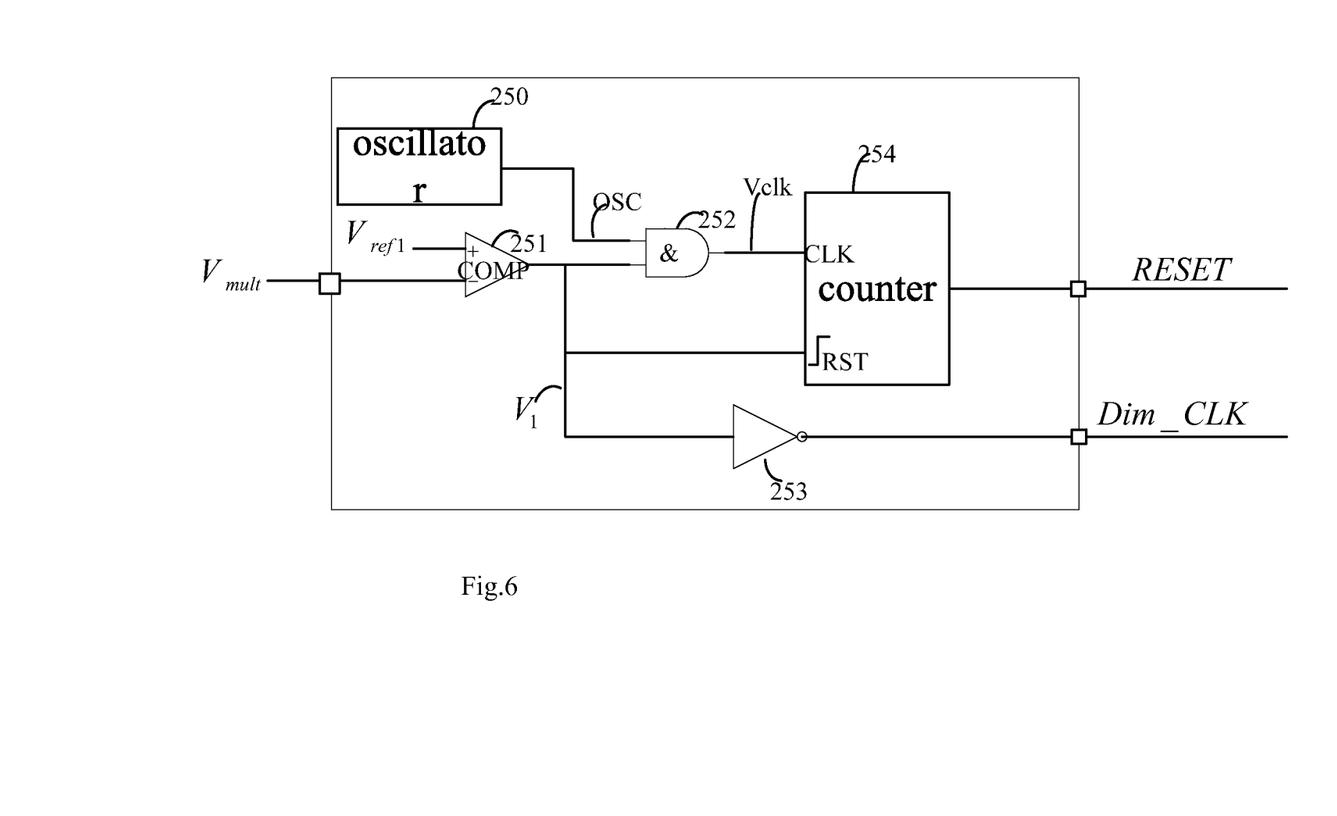
FIG. 6 shows a circuit schematic diagram of the dimming action determining module in the LED dimming device in FIG. 5.

FIG. 6 shows a circuit schematic diagram of the dimming action determining module in the LED dimming device in FIG. 5. As shown in FIG. 6, the dimming action detector comprises a comparator 251, an oscillator 250, an and gate 252, a counter 254 and an inverter 253. In present embodiment, the comparator 251 receives a reference voltage $V_{ref}$ via the positive terminal, and couples the dimming action detector via the negative terminal for receiving sampling voltage $V_{mult}$. The comparator 251 outputs a comparison result to the first inputting terminal of the and gate 252 via an outputting terminal. Meanwhile, the outputting terminal of comparator 251 is coupled to the inputting terminal of the inverter 253 and the resetting terminal RST of the counter 254. The inverter 253 outputs the dimming state changing signal Dim_CLK. The oscillator 251 generates a timing pulse and outputs the timing pulse to the second inputting terminal of the and gate 252. The counter 251 couples an outputting terminal of the and gate 252 via a counting terminal CLK and outputs the resetting signal RESET via an outputting terminal of the counter. When receiving the dimming state changing signal Dim_CLK, the dimming state control module 206 generates a LED current control signal for controlling a current of the LED based on the dimming state changing signal Dim_CLK. When receiving the resetting signal RESET, the dimming state control module 206 clears stored dimming state information based on the resetting signal.

The work principle of the LED dimming device according to present invention is illustrated combining FIGS. 5 and 6. Referring now to FIG. 5, the switch 201 of the LED driving circuit is multiplexed as dimming action module 310. The sampling module 232 of the LED driving circuit can be multiplexed as the dimming action determining module 233. When switch 201 is turned off, sampling voltage $V_{mult}$ at connection point G in sampling module 232 of the LED driving circuit drops quickly, so dimming action determining module 205 determines the type of the switch action.

Figure 7:
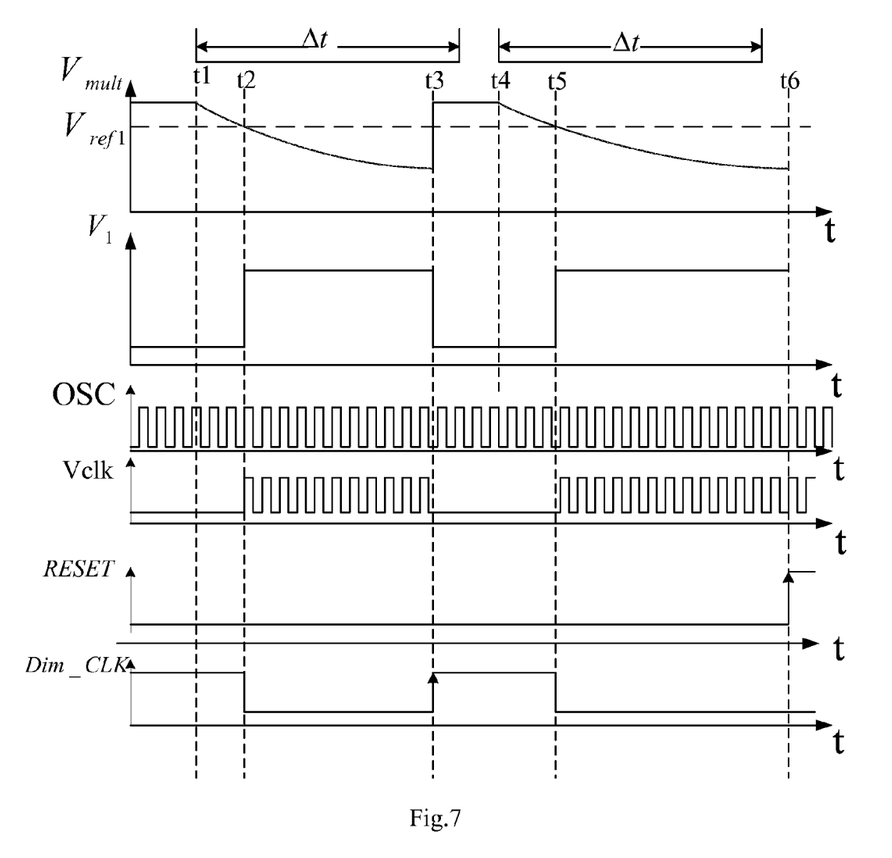
FIG. 7 shows the perfect operation wave of the dimming action determining module in FIG. 6.

The embodiment of the dimming action determining module 205 is shown in FIG. 6. The action of the switch 201 is sensed by the sampling voltage $V_{mult}$ at connection point G. When the time duration between the turnoff and turnon of the switch 201 is shorter than a predefined time Δt, such action is determined to be a dimming action. Then the dimming state changing signal Dim_CLK of the dimming action determining module 205 outputs a voltage rising edge. When the time duration between the turnoff and turnon of the switch 201 is longer than a predefined time Δt, such action is determined to be an open and close action. Then the dimming action determining module 205 outputs the resetting signal RESET to clear stored dimming state information based on the resetting signal RESET, and restarts. The specific operation wave is shown in FIG. 7. Referring FIG. 7, at moment $t_1$, switch 201 is turned off (which means "opened"), sampling voltage $V_{mult}$ at connection point G discharges and drops. Until moment $t_2$, sampling voltage $V_{mult}$ at connection point G drops to lower than $V_{ref1}$. Outputting voltage $V_1$ of comparator 251 jumps from a low voltage to a high voltage. The rising edge of outputting voltage $V_1$ restarts counter 254. The counter 254 is cleared and begins to count again. Meanwhile, the high level signal of outputting voltage $V_1$ enables a timing pulse generated by the oscillator 250 to be inputted into counting terminal CLK of counter 251. The counter 251 counts the timing pulse. At moment $t_3$, switch 201 is turned on (which means "closed"), sampling voltage $V_{mult}$ at connection point G increases. Outputting voltage $V_1$ of comparator 251 returns back to a low voltage. No timing pulse reaches the counting terminal CLK of counter 251, so counter 251 stops counting. Then the dimming state changing signal Dim_CLK of the dimming action determining module 205 outputs a voltage rising edge representing that a dimming action is triggered. At this moment, time duration to moment $t_1$ is shorter than Δt. At moment $t_4$, switch 201 is turned off again, and the off time is longer than Δt, no counter 254 outputs a RESET signal for clearing stored dimming state information based on the resetting signal.

Figure 8:
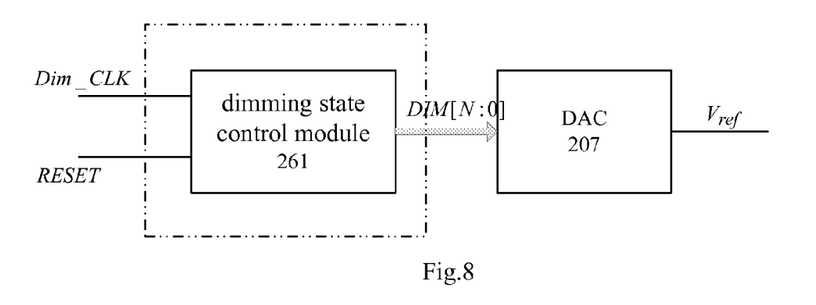
FIG. 8 shows a circuit schematic diagram of the dimming state control module in the LED dimming device in FIG. 5 according to a first embodiment of present invention.
Figure 9:
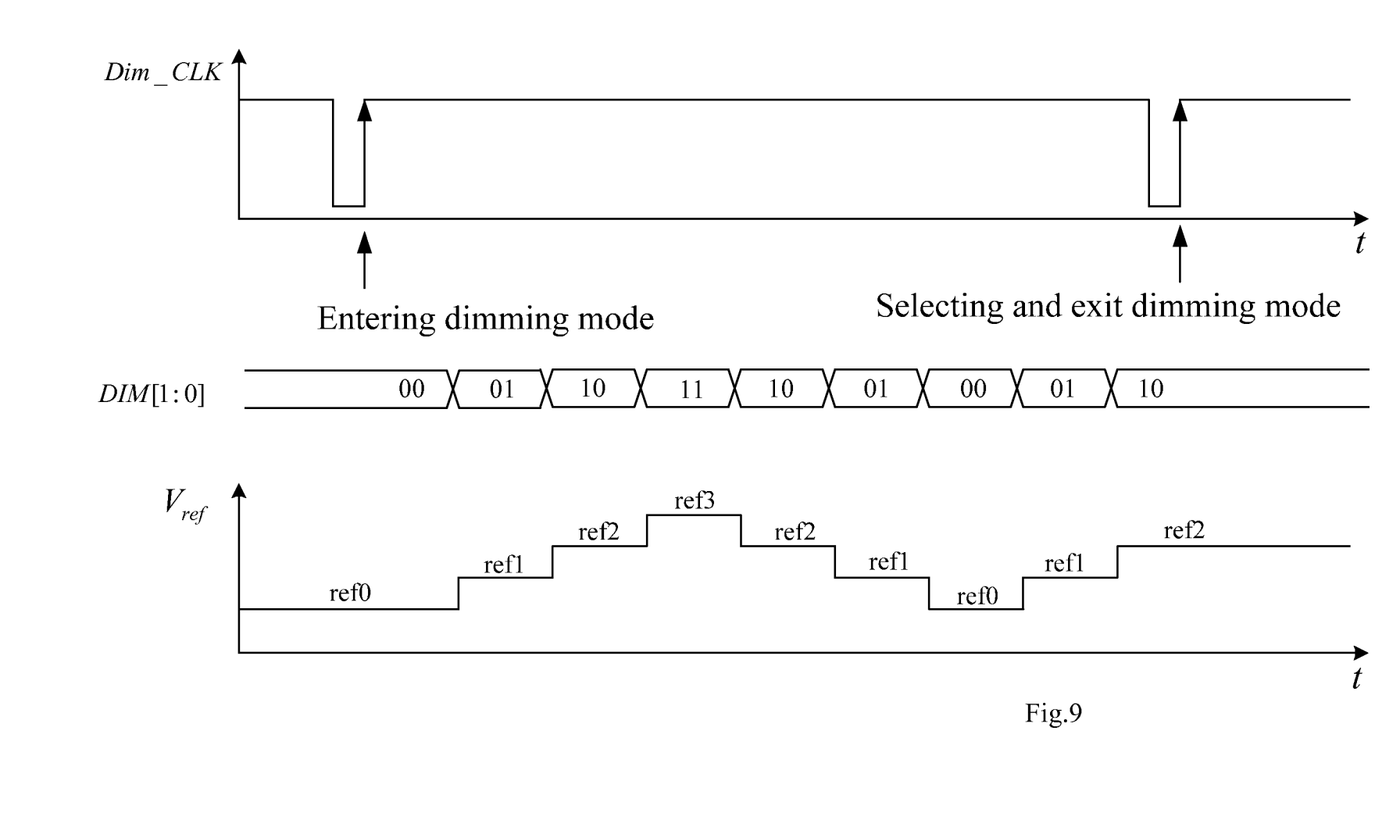
FIG. 9 shows the perfect operation wave of the dimming state control module in FIG. 8.

FIG. 8 shows a circuit schematic diagram of the dimming state control module in the LED dimming device in FIG. 5 according to a first embodiment of present invention. In present embodiment, functions of dimming state control module 206 in FIG. 5 is implemented by dimming state control module 261 in FIG. 8, the typical operation wave of which is shown in FIG. 9. In present embodiment, when dimming state control module 261 senses a rising edge of the dimming state changing signal Dim_CLK, a dimming pattern is started. In the dimming pattern, state signal DIM[N:0] outputted by dimming state control module 261 circularly changes all the time. Then the state signal DIM[N:0] is converted by the successive digital-to-analog converter 207 to corresponding voltage $V_{ref}$ for changing the lightness of the LEDs. During the dimming pattern, when a rising edge of the dimming state changing signal Dim_CLK is sensed, select a current voltage $V_{ref}$ and exit the dimming pattern. Although FIG. 9 takes N=2 as an example, one skilled in the art knows that, N can be any number according to different application requirements. Theoretically, dimming according to present invention can achieve any precision.

Figure 10:
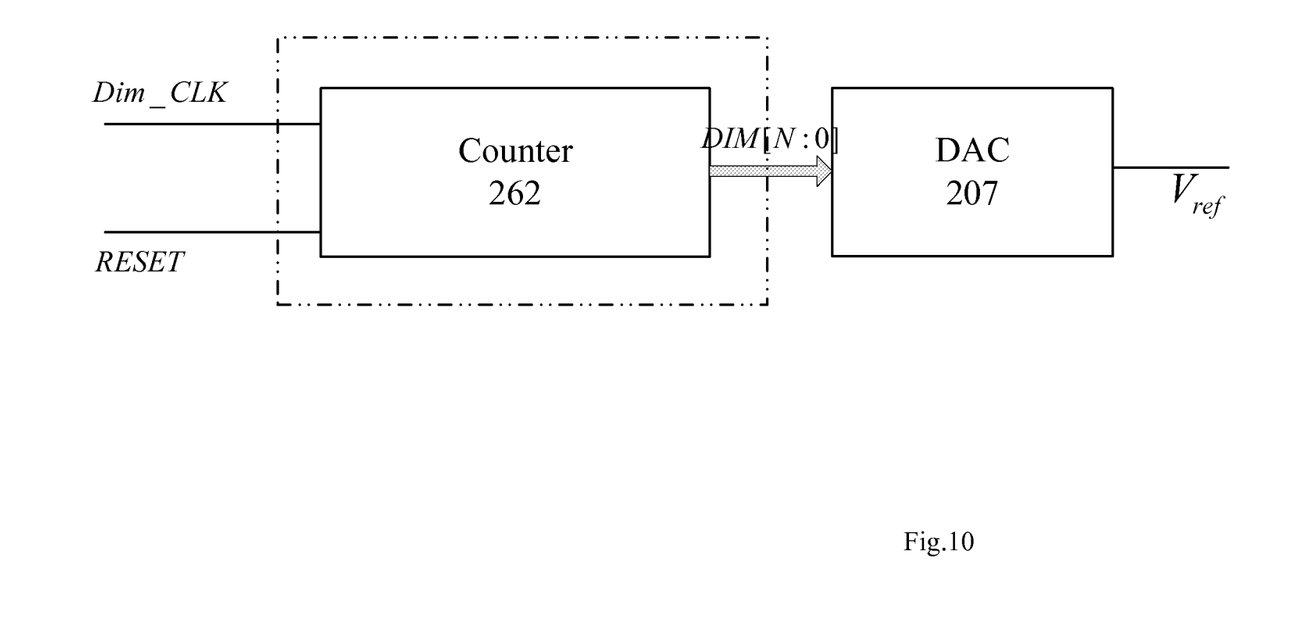
FIG. 10 shows a circuit schematic diagram of the dimming state control module in the LED dimming device in FIG. 5 according to a second embodiment of present invention.
Figure 11:
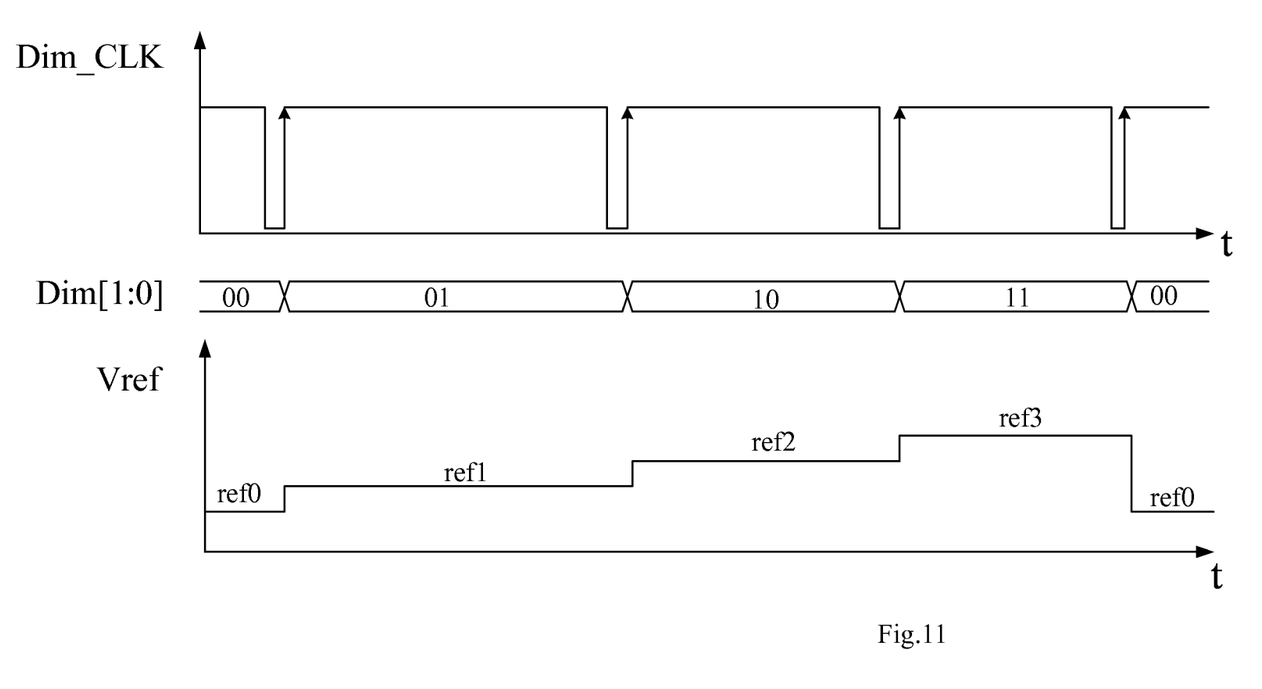
FIG. 11 shows the perfect operation wave of the dimming state control module in FIG. 10.

FIG. 10 shows a circuit schematic diagram of the dimming state control module in the LED dimming device in FIG. 5 according to a second embodiment of present invention. In present embodiment, functions of dimming state control module 206 in FIG. 5 is implemented by a counter 262. In present embodiment, when sensing a rising edge of the dimming state changing signal Dim_CLK, the output of counter 262 increases by 1. Different output values are converted by the successive digital-to-analog converter 207 to corresponding voltage $V_{ref}$ for changing the lightness of the LEDs. Similarly, taking N=2 as an example, the typical operation wave of which is shown in FIG. 11. When a rising edge of the dimming state changing signal Dim_CLK is sensed, DIM[1:0] increase by 1. Accordingly, when the switch is turned off and then on quickly by once, the lightness of the LEDs changes once.

A LED dimming and driving circuit is also disclosed by present application, which comprises a LED driving circuit and the LED dimming device mentioned above. Actually, FIGS. 4 and 5 have disclosed such a LED driving circuit 400 and 500. Based on the disclosure of present invention, one skilled in the art can construct such a LED driving circuit, which is not discussed in detail for concision.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What claimed is:

1. A LED dimming device connected with a LED driving circuit and comprising:
   a dimming action module for generating a dimming action signal;
   a dimming action detector for generating a dimming instruction voltage based on the dimming action signal;
   a dimming action determining module for generating a dimming state changing signal or a resetting signal based on the dimming instruction voltage; and
   a dimming state control module for generating a LED current control signal for controlling a current of the LED based on the dimming state changing signal or clearing stored dimming state information based on the resetting signal;
   wherein, the dimming action detector comprises:
      a comparator for receiving a reference voltage via a positive terminal and coupling the dimming action detector via a negative terminal;
      an oscillator for generating a timing pulse;
      an AND gate for coupling the oscillator via a first inputting terminal and coupling an outputting terminal of the comparator via a second inputting terminal;
      a counter for coupling an outputting terminal of the AND gate via a counting terminal, coupling the outputting terminal of the comparator via a resetting terminal, and outputting the resetting signal via an outputting terminal; and an inverter for coupling the outputting terminal of the comparator via an inputting terminal, and outputting the dimming state changing signal via an outputting terminal.

2. The LED dimming device according to claim 1, wherein, further comprising a digital-to-analog converter for converting a digital LED current control signal generated by the dimming state control module to an analog LED current control signal.

3. The LED dimming device according to claim 1, wherein, the dimming action module multiplexes an inputting switch of the LED driving circuit.

4. The LED dimming device according to claim 3, wherein, the inputting switch is connected between an AC input terminal and a rectification module of the LED driving circuit.

5. The LED dimming device according to claim 3, wherein, the dimming action detector multiplexes a sampling module of the LED driving circuit.

6. The LED dimming device according to claim 5, wherein, the sampling module comprises a first sampling resistor, a second sampling resistor and a sampling capacitor, wherein the first sampling resistor and the second sampling resistor are connected in series between an outputting terminal of the rectification module and ground, the connection point of the first sampling resistor and second sampling resistor outputs the dimming instruction voltage, the sampling capacitor is connected between the connection point and ground.

7. A LED dimming and driving circuit comprising a LED driving circuit and a LED dimming device connected with the LED driving circuit and comprising:
   a dimming action module for generating a dimming action signal;
   a dimming action detector for generating a dimming instruction voltage based on the dimming action signal;
   a dimming action determining module for generating a dimming state changing signal or a resetting signal based on the dimming instruction voltage; and
   a dimming state control module for generating a LED current control signal for controlling a current of the LED based on the dimming state changing signal or clearing stored dimming state information based on the resetting signal;

the dimming action detector comprises:
   a comparator for receiving a reference voltage via a positive terminal and coupling the dimming action detector via a negative terminal;
   an oscillator for generating a timing pulse;
   an AND gate for coupling the oscillator via a first inputting terminal and coupling an outputting terminal of the comparator via a second inputting terminal;
   a counter for coupling an outputting terminal of the AND gate via a counting terminal, coupling the outputting terminal of the comparator via a resetting terminal, and outputting the resetting signal via an outputting terminal; and
   an inverter for coupling the outputting terminal of the comparator via an inputting terminal, and outputting the dimming state changing signal via an outputting terminal.

8. The LED dimming and driving circuit according to claim 7, wherein, the LED dimming device further comprises a digital-to-analog converter for converting a digital LED current control signal generated by the dimming state control module to an analog LED current control signal.

9. The LED dimming and driving circuit according to claim 7, wherein, the dimming action module multiplexes an inputting switch of the LED driving circuit.

10. The LED dimming and driving circuit according to claim 9, wherein, the inputting switch is connected between an AC input terminal and a rectification module of the LED driving circuit.

11. The LED dimming and driving circuit according to claim 7, wherein, the dimming action detector multiplexes a sampling module of the LED driving circuit.

12. The LED dimming and driving circuit according to claim 11, wherein, the sampling module comprises a first sampling resistor, a second sampling resistor and a sampling capacitor, wherein the first sampling resistor and the second sampling resistor are connected in series between an outputting terminal of the rectification module and ground, the connection point of the first sampling resistor and second sampling resistor outputs the dimming instruction voltage, the sampling capacitor is connected between the connection point and ground.

* * * * *